May 10, 1949.     H. W. PHAIR     2,469,782
UNIVERSAL GYROSCOPE-SUSPENSION SYSTEM
Filed Nov. 5, 1945
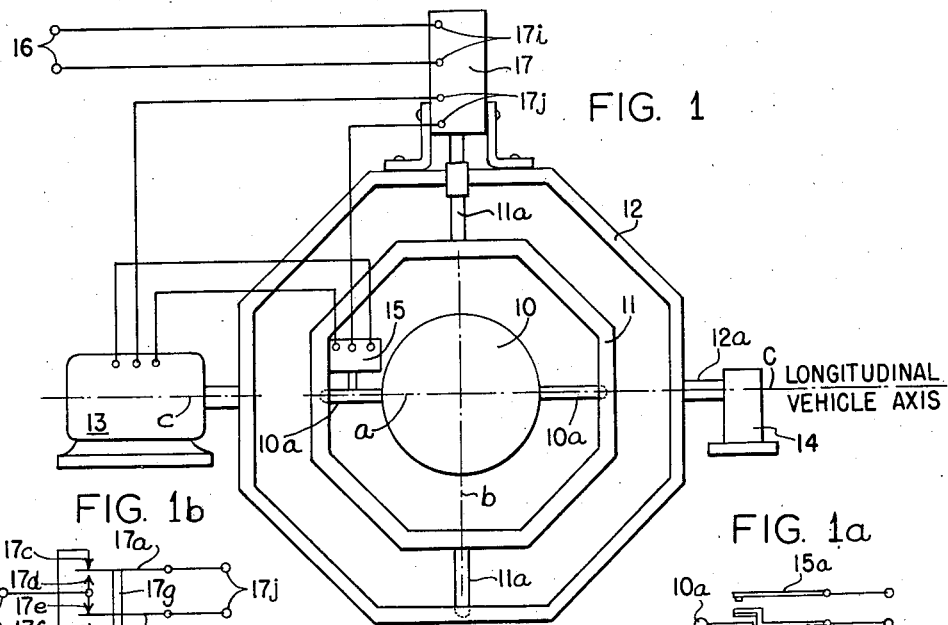
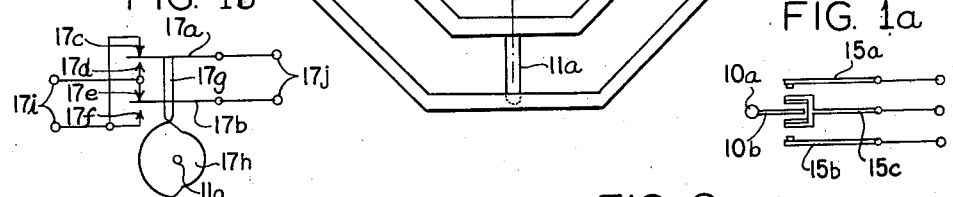
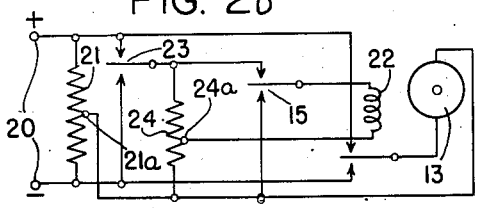
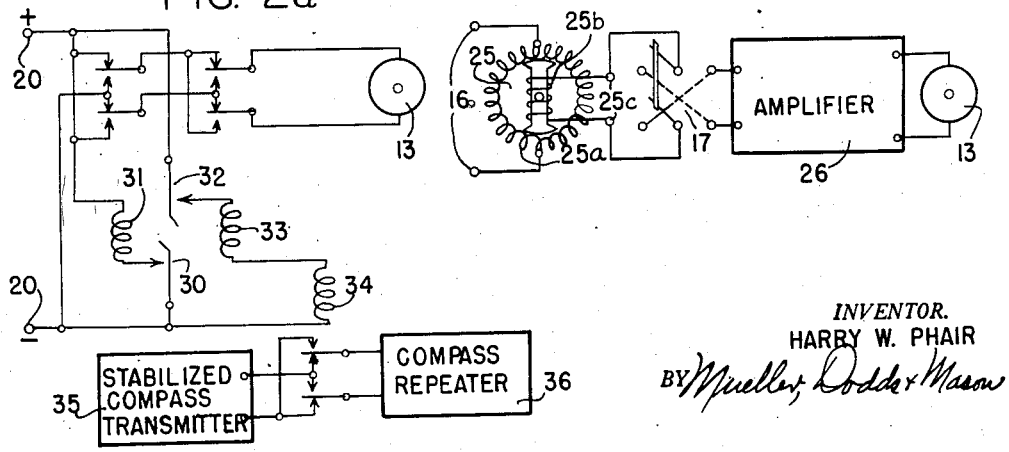
*INVENTOR.*
HARRY W. PHAIR
BY Mueller, Dodds & Mason
ATTORNEYS Patented May 10, 1949

2,469,782

UNITED STATES PATENT OFFICE 2,469,782

UNIVERSAL GYROSCOPE-SUSPENSION SYSTEM

Harry W. Phair, Lyndhurst, N. J., assignor to Fairchild Camera and Instrument Corporation, a corporation of Delaware Application November 5, 1945, Serial No. 626,595

6 Claims. (Cl. 74—5.47)

This invention relates to universal gyroscope-suspension systems and, while it is of general application, it is particularly adapted for embodiment in such systems of the type which indicates or controls the attitude of a mobile vehicle, such as an airplane or a ship.

In the operation of gyroscope systems for indicating and controlling the attitude of a mobile vehicle, it has been found that, under certain conditions, for example in the diving of an airplane, the normal to the plane including the normal pivotal axes of the gimbal support deviates widely from the spin axis of the gyroscope and, in extreme cases, the gimbal ring tends to become coplanar with the spin axis. When this condition is reached or approached, the behaviour of the gyroscope becomes erratic and unreliable.

It has heretofore been proposed to mount the gimbal ring pivotally within an outer or auxiliary gimbal ring about an axis normally coinciding with a pivotal axis of the gyroscope element in the main gimbal ring and to provide a followup system responsive to deviation of the main gimbal ring about such axis for rotating the auxiliary ring by an equal amount and in the opposite sense so as to maintain the plane of the gimbal ring approximately normal to the spin axis of the gyroscope element. However when such an arrangement is installed on an aircraft with the pivotal axis of the gyroscope element in the main gimbal ring parallel to the longitudinal axis of the craft, if the craft in extreme maneuvers passes through the vertical position, that is through the position of an alignment of the auxiliary gimbal ring with the spin axis of the gyroscope element, the followup system reverses sense. As a result, deviation of the main gimbal ring from a plane normal to the spin axis gives rise to a rotational adjustment of the auxiliary gimbal ring in a sense to increase such deviation rather than in a sense to compensate therefor, thus rendering the system effectively inoperative.

It is an object of the present invention, therefore, to provide an improved system for universally supporting a gyroscope from a mobile vehicle which avoids the above-mentioned disadvantages of the arrangements of the prior art and is simple and reliable in operation.

It is another object of the invention to provide an improved gyroscope suspension system of the type described, in which the plane of the gimbal ring of the gyroscope is maintained approximately normal to the spin axis of the gyroscope for all attitudes of the vehicle on which it is mounted.

In accordance with the invention, a system for universally supporting a gyroscope from a mobile vehicle comprises a main gimbal ring support for the gyroscope having a first pivotal axis and a second pivotal axis normal thereto and an auxiliary gimbal ring supporting the first ring and having a pivotal axis normally coinciding with the first pivotal axis. The system also includes power means for rotating the auxiliary gimbal ring about its pivotal axis, means responsive to rotation of the main gimbal ring about the first pivotal axis for controlling the power means to cause the auxiliary gimbal ring to position the main ring to maintain the rotation thereof about the first axis within predetermined limits, and means responsive to rotation of the auxiliary ring about the second pivotal axis through the normal to the plane of the main ring for reversing the sense of action of the controlling means.

For a better understanding of the invention, together with other and further objects thereof, reference is had to the following description taken in connection with the accompanying drawings, while its scope will be pointed out in the appended claims.

Referring now to the drawing,

Fig. 1 is a schematic representation of a system embodying the invention for universally supporting a gyroscope from a mobile vehicle;

Fig. 1a is a cross-sectional detail of a pickup mechanism embodied in the system of Fig. 1;

Fig. 2b is a schematic representation of the sensing switch suitable for use in the system of Fig. 1; while Figs. 2a, 2b, 2c and 2d are circuit diagrams of modified followup systems for controlling the auxiliary gimbal ring of the system of Fig. 1.

Referring now to Fig. 1 of the drawing, there is represented in schematic form a system for universally supporting a gyroscope 10 from a mobile vehicle and embodying the invention. This system comprises main gimbal ring support 11 for the gyroscope 10 having a pair of pivotal shafts 10a establishing a pivotal axis a about which the gyroscope 10 is pivotally supported from ring 11. The ring 11 is pivotally supported from a pair of pivotal shafts 11a, 11a defining a second pivotal axis b about which the ring 11 is pivotally supported. The axes a and b are normal to each other and normally lie in a plane normal to the spin axis of the gyroscope 10. The system also includes an auxiliary gimbal ring 12 supporting the main ring 11 and having a pivotal axis c, about which it is pivotally supported, normally coinciding with the pivotal axis a of gyroscope 10. The auxiliary gimbal ring 12 is provided with power means such as a reversible motor 13 for rotating it about its pivotal axis c. The ring 12 may be supported from the shaft of the motor 13 and from an auxiliary pivotal shaft 12a mounted in a standard 14 and is preferably mounted so that its pivotal axis c is approximately parallel to the longitudinal axis of the vehicle.

The system of the invention also includes means, such as a reversing switch 15, responsive to rotation of the main gimbal ring 11 about its axis a for controlling the power means, for example for energizing the motor 13 in such a sense as to cause the auxiliary gimbal ring 12 to position the main gimbal ring 11 and to maintain the rotation thereof about the axis a within predetermined limits, preferably to maintain the main ring 11 approximately normal to the spin axis of the gyroscope. A detail of the reversing switch 15, which may be of conventional construction, is shown in Fig. 1a from which it is seen that it comprises a pair of outer contacts 15a, 15b and a central movable contact 15c operable by an arm 10b on shaft 10a to close a circuit with either of the contacts 15a or 15b in accordance with the direction of rotation of the ring 11 on which the switch is supported relative to the pivotal shaft 10a. The reversing motor 13 is connected to be energized from suitable supply terminals 16 through one or the other of the contacts of the reversing switch 15 and through a second reversing or sensing switch 17 to be described.

The system also includes means, such as the reversing switch 17, in cascade with the reversing switch 15 and responsive to rotation of the auxiliary ring 12 about its pivotal axis b through the normal to the plane of the main gimbal ring 11, that is through the vertical, for reversing the sense of action of the first reversing switch 15. The reversing switch 17 may be of the construction shown in Fig. 1b, comprising a pair of movable contacts 17a, 17b cooperating with two pairs of stationary contacts 17c, 17d and 17e, 17f, respectively, to form a double-pole double-throw reversing switch. The movable contacts 17a and 17b are adapted to be actuated by a follower 17g actuated by a cam 17h mounted on an extension of the pivot shaft 11a. The switch 17 is provided with input terminals 17i and output terminals 17j.

In considering the operation of the system described, it will be assumed that initially the vehicle on which the gyroscope system is supported has its normal attitude so that the plane including the pivotal axes a and b of the main gimbal ring 11 is normal to the spin axis of the gyroscope 10 and the axis a coincides with the axis c of the auxiliary gimbal ring 12. If now the vehicle goes into an extreme bank or roll, the inner gimbal ring 11 will rotate through the corresponding angle about the axis a; and, in such position, the behaviour of the gyroscope tends to become erratic and unreliable. Under this condition, the switch 15 operates to close a circuit through one of its outer contacts 15a and 15b and its movable contact 15c which energizes the motor 13 to rotate the auxiliary gimbal ring 12, and with it the main gimbal ring 11, about the pivotal axis c to position or restore the main gimbal ring 11 to its normal attitude and to maintain the rotation thereof about its pivotal axis a within predetermined limits. The action described plus the free pivotal motion of the auxiliary gimbal ring 12 relative to the main gimbal ring 11 about the pivotal axis b is effective to maintain the plane of the main gimbal ring 11 substantially normal to the spin axis of the gyroscope and thus insure accurate and reliable operation.

If the gyroscope system described is mounted on an aircraft or other mobile vehicle the longitudinal axis of which, during maneuvering, may undergo extreme angular movements even through the normal to the plane of the main gimbal ring 11, that is through the vertical, the sense of the control effected by the reversing switch 15 reverses. That is, in such extreme attitudes, rotation of the main gimbal ring 11 about its axis a operates the reversing switch 15 in such a sense as to cause the motor 13 to drive the auxiliary gimbal ring 12 in such sense as to increase, rather than decrease, the rotation of the gimbal ring 11 from its normal attitude. With the improved gyroscope supporting system described, however, the reversing switch 17 is effective under these conditions to introduce a reversal of the connection of the motor 13 to the supply circuit terminals 16 so as to reverse the sense of action of the first reversing switch 15. This result is procured by shaping the cam 17h of the reversing switch 17 so that it actuates the movable contacts 17a, 17b thereof from one position to the other whenever the attitude of the vehicle is such as to cause the auxiliary gimbal ring 12 to pass through the normal to the plane of the main gimbal ring 11; that is, whenever it passes through the vertical.

It is noted that the cam 17h of the switch 17 has appreciable sloping portions between the portions corresponding to the two positions of the switch. In applications in which a high degree of precision of the control system is not required, the switch may be designed so that, over the greater part of these sloping portions, the movable contacts 17a and 17b are in neutral position, so that neither circuit is closed and the followup system is inactive. These sloping portions are adjusted to correspond to the position of the auxiliary gimbal ring 11 approximately in the vertical and of either sense, as it is not necessary to cause a constant operation of the switch 17 and reversal of the motor 13 if the craft is operating with longitudinal attitude of one sense or the other in the region of the vertical.

In Fig. 2a is schematically represented a modified form of the control circuit of the system of Fig. 1, particularly suitable for operating from direct-current supply circuit terminals 20, 20. In this case, there is connected across the terminals 20 a voltage-dividing resistor 21 having an electrical mid-tap 21a. The reversing switch 17 is connected across the terminals 20 and its output terminals 17j are connected to the outer contacts of the switch 15. There is provided an auxiliary polarized relay 22 energized from the supply terminals 20 by connection between the movable contact of the switch 15 and the midpoint 21a of resistor 21. The relay 22 is provided with outer stationary contacts and a central movable contact connected to excite the motor 13 for rotation in either direction; specifically, the control motor 13 is connected between the midpoint 21a of resistor 21 and the movable contact of relay 22. It will be understood that the reversing switches 15 and 17 are to be mounted as in the system of Fig. 1 and that, as in the system of Fig. 1, switch 15 comprises a two-position switch connected to be actuated to one position or the other in accordance with the direction of, and in response to, rotation of the main gimbal ring 11 about the pivotal axis a. The switch 15 is effective to control the polarity of excitation of the relay 22 from the supply terminals 20 and thus to control the motor 13 to rotate the auxiliary ring 12 about its pivotal axis c to compensate for rotation of the gimbal ring 11 about the axis a. The operation of the system of Fig. 2a is in all respects similar to that of Fig. 1, the use of the midpoint voltage-dividing resistor 21 and the polarized relay 22 adapting the system for operation with the reversible direct-current motor 13.

In Fig. 2b, there is represented schematically the circuit diagram of a modification of the system of Fig. 2a in which the double-pole double-throw reversing switch 17 is replaced by a single-pole double-throw reversing switch 23 which may be in all respects similar to the switch 15 of Fig. 1. In this case, a second voltage-divider resistor 24 is connected between the movable contact of the switch 23 and the midpoint 21a of voltage-divider resistor 21 while the relay 22 connected to control the control motor 13, as in the system of Fig. 2a, is connected between the midpoint 24a of resistor 24 and the movable contact of the switch 15. In this arrangement, the single-pole reversing switch 23 and the voltage-divider resistor 24 take the place of the double-pole reversing switch 17 of Fig. 1 and the switch 23 constitutes a second two-position switch in series with the switch 15 and responsive to rotation of the auxiliary ring 12 through the vertical for reversing the sense of action of the two-position switch 15. The operation of the system is similar to that of Fig. 1.

In some cases, it is desirable to maintain the plane of the main gimbal ring 11 accurately normal to the spin axis of the gyroscope. This is facilitated by the proportional follow-up system of Fig. 2c in which the reversing switch 15 is replaced by a rotary transformer 25 comprising a primary or stator winding 25a and a salient pole secondary or rotor winding 25b rotatable relative to the winding 25a. In this arrangement, the windings 25a and 25b are individually mounted on the gyroscope pivot shaft 10a and on the main gimbal ring 11, or vice versa. The signal output of the winding 25b appears at the terminals 25c and is connected through the reversing switch 17 and an amplifier 26 to the control motor 13. In this arrangement, the signal developed by the rotary transformer 25 at the terminals 25c is of a polarity dependent upon, and of an amplitude proportional to, rotational movement of the main gimbal ring 11 about its axis a. This signal, as modified by the sensing or reversing switch 17, is applied to the amplifier 26 to drive the motor 13 in a sense and at a rate proportional to the polarity and amplitude of the signal at the terminals 25c, that is in a sense and at a rate proportional to the sense and angular rotation of the ring 11 about its axis a. This system provides maximum speed and accuracy of control since, the greater the initial rotation of the ring 11 about the axis a, the greater the speed of operation of the motor 13 to actuate the auxiliary ring 12 to return the ring 11 to its normal attitude.

In case the system of the invention is installed on a vehicle such as an aircraft having other instruments or controls stabilized by the same gyroscope and in case the aircraft maneuvers through extreme angles passing through the vertical, the other gyroscopic instruments or controls may reverse their sense without changing their azimuthal position relative to the earth, resulting in 180° azimuthal errors. These errors may also be corrected by means of a system embodying the invention as shown in the modified circuit of Fig. 2d which is designed for operation from direct-current supply terminals 20, 20. In the system of Fig. 2d the reversing switch 15 is replaced by a simple on-off switch 30 in which the contacts are closed for positions of the gimbal ring 11 on one side of neutral and open for positions on the other side of neutral. This switch is connected to energize a relay 31 from the supply terminals 20, 20, the relay 31 having contacts equivalent to a double-pole double-throw reversing switch. Similarly, the reversing switch 17 of the system of Fig. 1 is replaced by a simple off-on switch 32 which is connected to energize relays 33, 34 in series across the supply circuit terminals 20. The relay 33 also is provided with contacts equivalent to a double-pole double-throw reversing switch. The control motor is energized from supply circuit terminals 20, 20 through the contacts of relays 31 and 32 in series so that the control of the motor 13 is in all respects similar to that of the system of Fig. 1.

The system of Fig. 2d is indicated as including also a gyro-compass repeating system comprising a stabilized compass transmitter 35 and a compass repeater 36 interconnected through the contacts of relay 34, which are also the equivalent of a double-pole double-throw reversing switch. In the system of Fig. 2d the maneuvering of the vehicle so that the axis c of Fig. 1 passes through the normal to the plane of the gimbal ring 11, that is the vertical, is effective to close the contacts 32 to energize the relays 33 and 34, thus reversing the sense of operation of the control motor 13. Simultaneously the connections between the compass-transmitter unit 35 and the compass-repeater unit 36 are reversed to compensate for the reversal of azimuth of the vehicle without a corresponding reversal in the azimuthal position of the stabilized compass transmitter.

In applications of the gyro-supporting system of the invention to devices such as gyro-compass systems such as the system 35, 36 in which no azimuthal rotation of the gyroscope casing can be tolerated, the axis c of the auxiliary ring 12 must be substantially parallel to the longitudinal axis of the vehicle.

Where there have been described what are at present considered to be the preferred embodiments of the invention, it will be apparent to those skilled in the art that various changes and modications may be made therein without departing from the spirit or scope of the invention.

What is claimed as new is:

1. A system for universally supporting a gyroscope from a mobile vehicle comprising, a main gimbal ring support for said gyroscope having a first pivotal axis and a second pivotal axis normal thereto, an auxiliary gimbal ring supporting said first ring and having a pivotal axis normally coinciding with said first pivotal axis, power means for rotating said auxiliary gimbal ring about its pivotal axis, means responsive to rotation of said main gimbal ring about said first pivotal axis for controlling said power means to cause said auxiliary gimbal ring to position said main ring to maintain the rotation thereof about said first axis within predetermined limits, and means responsive to rotation of said auxiliary ring about said second pivotal axis through the normal to the plane of said main ring for reversing the sense of action of said controlling means.

2. A system for universally supporting a gyroscope from a mobile vehicle comprising, a main gimbal ring support for said gyroscope having a first pivotal axis and a second pivotal axis normal thereto, an auxiliary gimbal ring supporting said first ring and having a pivotal axis normally coinciding with said first pivotal axis, reversible motor means for rotating said auxiliary gimbal ring about its pivotal axis, a reversing switch responsive to rotation of said main gimbal ring about said first pivotal axis for energizing said motor in such a sense as to cause said auxiliary gimbal ring to position said main ring to maintain the rotation thereof about said first axis within predetermined limits, and means responsive to rotation of said auxiliary ring about said second pivotal axis through the normal to the plane of said main ring for reversing the sense of action of said reversing switch.

3. A system for universally supporting a gyroscope from a mobile vehicle comprising, a main gimbal ring support for said gyroscope having a first pivotal axis and a second pivotal axis normal thereto, an auxiliary gimbal ring supporting said first ring and having a pivotal axis normally coinciding with said first pivotal axis, power means for rotating said auxiliary gimbal ring about its pivotal axis, means responsive to rotation of said main gimbal ring about said first pivotal axis for controlling said power means to cause said auxiliary gimbal ring to maintain said main ring approximately normal to the spin axis of said gyroscope, and means responsive to rotation of said auxiliary ring about said second pivotal axis through the normal to the plane of said main ring for reversing the sense of action of said controlling means.

4. A system for universally supporting a gyroscope from a mobile vehicle comprising, a main gimbal ring support for said gyroscope having a first pivotal axis and a second pivotal axis normal thereto, an auxiliary gimbal ring supporting said first ring and having a pivotal axis normally coinciding with said first pivotal axis and approximately parallel to the longitudinal axis of the vehicle, power means for rotating said auxiliary gimbal ring about its pivotal axis, means responsive to rotation of said main gimbal ring about said first pivotal axis for controlling said power means to cause said auxiliary gimbal ring to position said main ring to maintain the rotation thereof about said first axis within predetermined limits, and means responsive to rotation of said auxiliary ring about said second pivotal axis through the vertical for reversing the sense of action of said controlling means.

5. A system for universally supporting a gyroscope from a mobile vehicle comprising, a main gimbal ring support for said gyroscope having a first pivotal axis and a second pivotal axis normal thereto, an auxiliary gimbal ring supporting said first ring and having a pivotal axis normally coinciding with said first pivotal axis, reversible motor means for rotating said auxiliary gimbal ring about its pivotal axis, a first reversing switch responsive to rotation of said main gimbal ring about said first pivotal axis for energizing said motor in such a sense as to cause said auxiliary gimbal ring to position said main ring to maintain the rotation thereof about said first axis within predetermined limits, and a second reversing switch connected in cascade with said first reversing switch and responsive to rotation of said auxiliary ring about said second pivotal axis through the normal to the plane of said main ring for reversing the sense of action of said first reversing switch.

6. A system for universally supporting a gyroscope from a mobile vehicle comprising, a main gimbal ring support for said gyroscope having a first pivotal axis and a second pivotal axis normal thereto, an auxiliary gimbal ring supporting said first ring and having a pivotal axis normally coinciding with said first pivotal axis, reversible motor means for rotating said auxiliary gimbal ring about its pivotal axis, a rotary transformer comprising primary and secondary windings individually mounted on said gyroscope and said main gimbal ring and responsive to rotation of said main gimbal ring about said first pivotal axis for controlling said motor means proportionally to said rotation to cause said auxiliary gimbal ring to position said main ring to maintain the rotation thereof about said first axis within predetermined limits, and means responsive to rotation of said auxiliary ring about said second pivotal axis through the normal to the plane of said main ring for reversing the polarity of connections of one of said transformer windings.

HARRY W. PHAIR.

REFERENCES CITED

The following references are of record in the file of this patent:

UNITED STATES PATENTS

| Number | Name | Date |
| --- | --- | --- |
| 1,324,128 | Meitner | Dec. 9, 1919 |
| 1,679,354 | Fairchild et al. | Aug. 7, 1928 |
| 2,368,644 | Curry | Feb. 6, 1945 |

FOREIGN PATENTS

| Number | Country | Date |
| --- | --- | --- |
| 439,630 | Great Britain | Dec. 11, 1935 |

Disclaimer 2,469,782.—*Harry W. Phair*, Lyndhurst, N. J. UNIVERSAL GYROSCOPE-SUSPENSION SYSTEM. Patent dated May 10, 1949. Disclaimer filed Oct. 22, 1951, by the inventor, the assignee, *Fairchild Camera and Instrument Corporation*, assenting.

Hereby enters this disclaimer to claims 1, 3, and 4 of said patent.

[*Official Gazette November 27, 1951.*]